United States Patent [19]
Hatke

[11] 3,780,726
[45] Dec. 25, 1973

[54] HEARTBEAT RATE MONITORING

[75] Inventor: Fred Louis Hatke, Skillman, N.J.

[73] Assignee: Hoffmann-La Roche Inc., Nutley, N.J.

[22] Filed: July 13, 1972

[21] Appl. No.: 271,307

Related U.S. Application Data

[63] Continuation-in-part of Ser. No. 205,948, Dec. 8, 1971.

[52] U.S. Cl............................ 128/2.05 T, 128/2.05 Z
[51] Int. Cl................................................. A61b 5/02
[58] Field of Search................... 128/2.05 P, 2.05 R, 128/2.05 T, 2.06 A, 2.06 F, 2.06 R

[56] References Cited
UNITED STATES PATENTS

| | | | |
|---|---|---|---|
| 3,593,705 | 7/1971 | Thomas et al. | 128/2.06 A |
| 3,654,916 | 4/1972 | Neilson | 128/2.06 A |
| 3,674,015 | 7/1972 | Berkovits | 128/2.06 F |
| 3,524,442 | 8/1970 | Horth | 128/2.06 A |

*Primary Examiner*—William E. Kamm
*Attorney*—Samuel L. Welt et al.

[57] ABSTRACT

Apparatus for monitoring the heartbeat rate of a patient comprising deriving, with pulse forming circuitry, electrical signals representative of heartbeat activity on a beat-to-beat data basis, a gating unit for normally passing the electrical signals, a first unit analyzing three successive ones of the electrical signals by a pair of credence checkers each having a preselected frequency tolerance to define a first criterion for distinguishing valid data and artifact and inhibiting operation of the gating unit upon detection of artifact, and a storage unit for receiving and averaging valid data over a period of three successive heartbeats to provide an output indicative of heartbeat rate. A second analyzing unit compares the third one of said signals with the last passed good data to define a second criterion for distinguishing valid data and artifact and upon detection of valid data inhibiting any effect on the gating unit by the first analyzer unit. Passed values are averaged and displayed and a visible indication denotes occurrence of an artifact.

4 Claims, 4 Drawing Figures

HEARTBEAT RATE MONITORING

CROSS-REFERENCES TO RELATED APPLICATIONS

It is noted that this application is a continuation-in-part of application Ser. No. 205,948, filed Dec. 8, 1971, entitled HEARTBEAT RATE MEASURING TECHNIQUE.

BACKGROUND OF THE INVENTION

The present invention relates generally to electrical signal processing techniques for accurately ascertaining the heartbeat frequency of a patient for monitoring purposes.

In the field of heart rate monitoring, numerous problems are incurred in providing an accurate heart rate for the reason that electrical artifact impulses indicative of noise or multiple heart signals within a single heartbeat may be erroneously judged as part of the heart rate count. In certain applications, i.e., in detecting and analyzing a fetal heartbeat, artifact signals are often generated as a result of the disturbances introduced by the changing fetal positions and mother movements including pressure changes caused by labor, to frequently produce two or even three signals per fetal heartbeat. The latter is even more likely to occur when ultrasound is utilized as the vehicle for monitoring the heart rate, for the reason that the reflections of the ultrasound might occur in response to not only movement of the front and back wall of the heart but in response to the heart valves and other motions about the fetal site.

As a consequence of these artifact problems, errors are often introduced in the counting of the heart signals and/or sounds, and might lead to an incorrect diagnosis giving rise to needless emergency measures in some instances or obscuring the need for emergency measures in other instances.

SUMMARY OF THE INVENTION

Accordingly, it is the purpose of the present invention to avoid such problems as those noted above by provision of an electrical signal processing technique that evaluates or analyzes the signal corresponding to at least three successive heart beats based on preselected frequency tolerance criteria as a first step to distinguish valid data from artifact and in addition anaylyzes the third one of said heart sounds with the last piece of valid data, to further ascertain the validity of each heart activity signal and ignore artifact.

DESCRIPTION OF THE PREFERRED EMBODIMENT

Figures 1, 2:
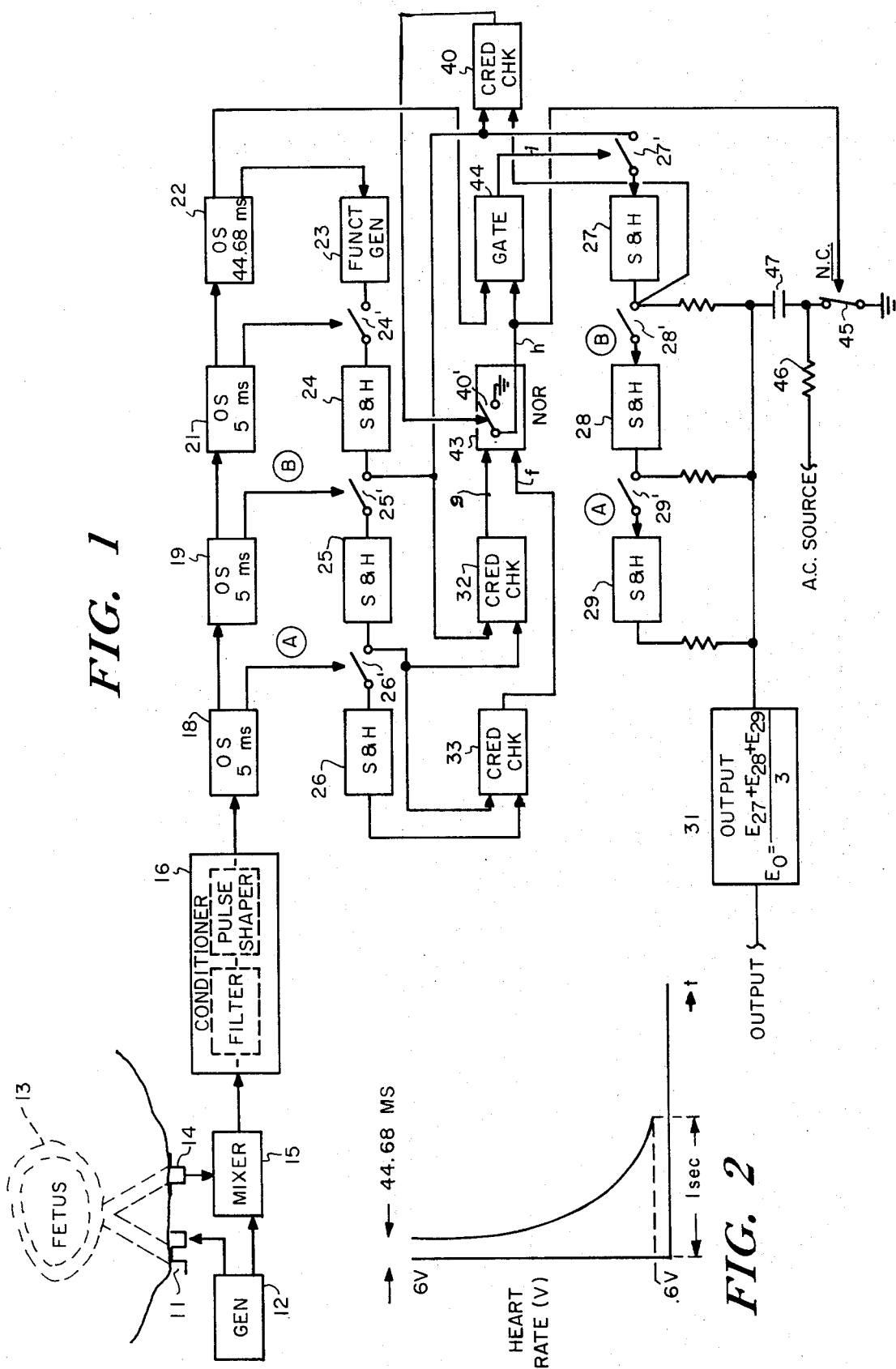
FIG. 1 is a block diagram of a scanning system in which the present invention is employed.
FIG. 2 is a voltage versus time graphic representation of the nonlinear hyperbolic signal generated by the function generator 23, shown in FIG. 1.

Referring to FIG. 1, there is shown a transmitting transducer 11 driven by generator 12 for transmitting ultrasonic energy to a fetus, roughly illustrated as 13, within the maternal abdomen. The ultrasonic energy transmitted to the body may be of the pulsed wave or continuous wave type. Although an ultrasonic system is illustrated at the front-end, it is readily understood that the present invention can be similarly employed with phonocardiographic or electrocardiographic techniques. A receiving transducer 14, adapted for deriving electrical impulse signals responds to the ultrasonic signals returned from the fetus 13. The receiving transducer 14 is connected to a mixer 15. Mixer 15 which is also connected from generator 12, amplifies the incoming signals and mixes them to provide a resultant Doppler signal output.

As was previously discussed, the output of the mixing unit 15 comprising a waveform complex, similar to a phonocardiographic output or electrocardiographic output, which includes a multitude of signals. The output signals from mixer 15 are processed by a conditioning unit 16 including a bandpass filter having a frequency range anywhere, for example, between 100 cycles and 400 cycles, and a pulse shaper for providing Doppler pulses of a uniform pulse width as, for example, 180 ms. which is equivalent to about 5 ½ heartbeats per second. If desired, the bandpass filter output might be connected to an audio amplifier (not illustrated) for driving earphones or a recorder. The conditioning unit 16 is connected to four one shot multivibrator units 18, 19, 21 and 22 connected in cascade and each being triggered for a period of 5 ms. except for one shot unit 22 which is triggered for a period of approximately 44.68 ms.

A function generator 23 connected from one shot 22, is adapted to generate a hyperbolic function approximation having an RC exponential decay as illustrated in FIG. 2, to decrease from the maximum of 6 volts to, for example, 0.6 volts at 1 second. The function generator capacitance begins charging up at the leading edge of the signal generated by one shot unit 22 and is held at the 6 V potential until released at the trailing edge. The function generator is made so that each point along the hyperbolic curve is indicative of a potential value representing a selected heart rate on a beat-to-beat basis. This similar function may also be achieved by utilizing a digital counter. At the leading edge of the next successive pulse generated by one shot 22 the potential value to which the exponential curve has decayed will represent a heart rate value determined by the time duration between two consecutive leading edges of pulses generated by one shot 22.

Function generator 23 is connected to a sample and hold unit 24 via switch 24', thence to a sample and hold unit 25 via switch 25' and thence to a sample and hold unit 26 via switch 26'. Sample and hold unit 24 is also connected to a credence checker 40 and to a sample and hold unit 27 via switch 27', thence to a sample and hold unit 28 via switch 28', and thence to a sample and hold unit 29 via switch 29'. All three of the sample and hold units 27, 28 and 29 are connected through separate resistors to an output unit 31 which is provided to indicate an average of the signals held in sample and hold units 27, 28 and 29.

Figure 3:
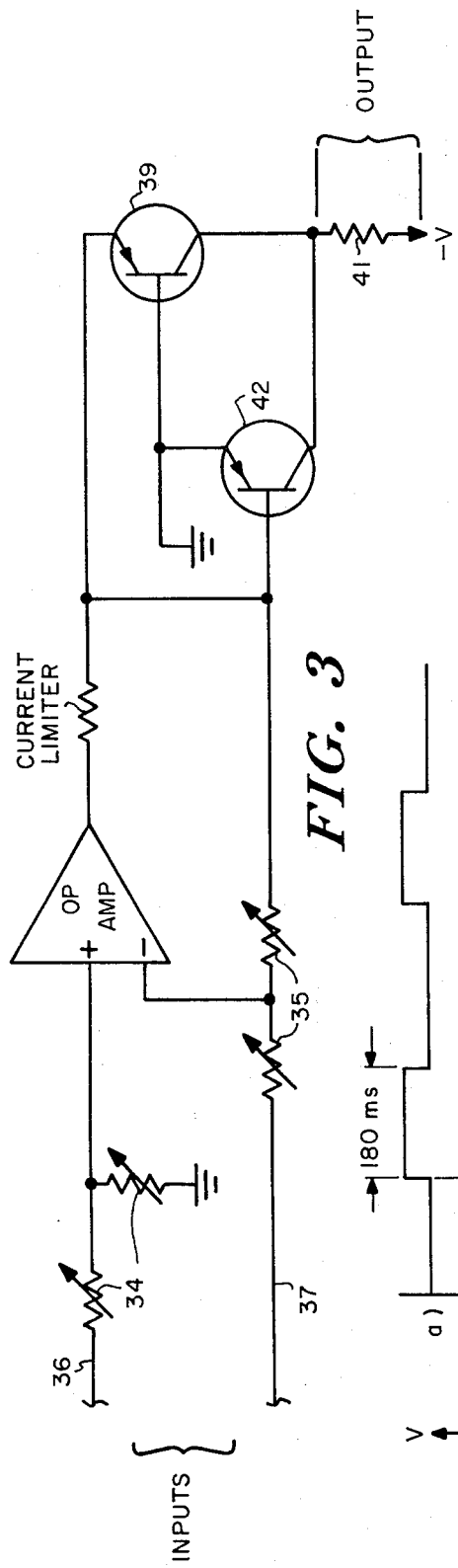
FIG. 3 is a schematic diagram of the credence checker 32 or 33 illustrated in FIG. 1.

Sample and hold units 24 and 25 are further connected to a credence checker 32, and sample and hold units 25 and 26 are connected to a credence checker 33. The credence checkers 32 and 33 act as comparators in that they are adapted to produce an output if the difference between their inputs are separated by more than a predetermined allowable limit. An example of the credence checker unit is illustrated in FIG. 3 wherein resistors 34 and 35 are adjustable to set the variable credence criteria selected. The input on lead 36 fed via resistors 34 might, for example, be from sample and hold unit 24 and the input on lead 27 fed via resistors 35 might, for example, be from the sample and hold unit 25. The inputs on leads 36 and 37 are compared at an operational amplifier 38. Should the input on lead 36 or lead 37 fall outside the potential on lead 37 or lead 37 by $\pm \Delta V$ where $\Delta V$ is the predetermined allowable limit, an output from amplifier 38 will appear across output load resistor 41. If V 36 is greater than V 37 + $\Delta V$ then transistor 39 will conduct, however, should V 36 be less than V 37 − $\Delta V$, transistor 42 will conduct. In the present embodiment one might use, for example the criteris $\pm 20$ beats per minute as the predetermined allowable limit.

With reference back to FIG. 1, credence checkers 32 and 33 are each connected to a NOR gate 43 which is inhibited upon an output generated from either or both of the credence checkers. NOR gate 43, in turn, is connected to a gate 44, which is also connected from the one shot unit 22 in such a manner that gate 44, will only pass the output of one shot 22 in the absence of an output from NOR gate 43, or, in effect, in the absence of outputs from either of the credence checkers 33 or 32. The gate 44 output controls the switch 27′ which is normally open at the input to sample and hold unit 27.

The third credence checker 40, connected from sample and hold unit 24 and output sample and hold unit 27, is coupled to NOR gate 43 in such a manner as to inhibit NOR gate 43, if the credence test based on a predetermined frequency tolerance is positive indicating that the difference frequency between its inputs fall within the prescribed frequency limits. Similar to credence checkers 32, 33, the frequency tolerance might use a criteria of $\pm 20$ beats per minute as a predetermined allowable deviation limit on a beat-to-beat basis. The manner of inhibiting NOR gate 43 may be accomplished by grounding its output lead through activation of an otherwise normally open switch 40′.

Switches 28′ and 29′ are respectively controlled by the outputs of one shot units 19 and 18. With reference back to NOR gate 43, this gate is also connected to a normally closed switch 45′ which normally grounds an AC source, for example, the 60 cycle line input, being passed via resistor 46. Otherwise, with switch 45 open the AC source input will be fed via capacitance 47 via output unit 31, which will be fed to a recorder or other similar display unit.

OPERATION

Figure 4:
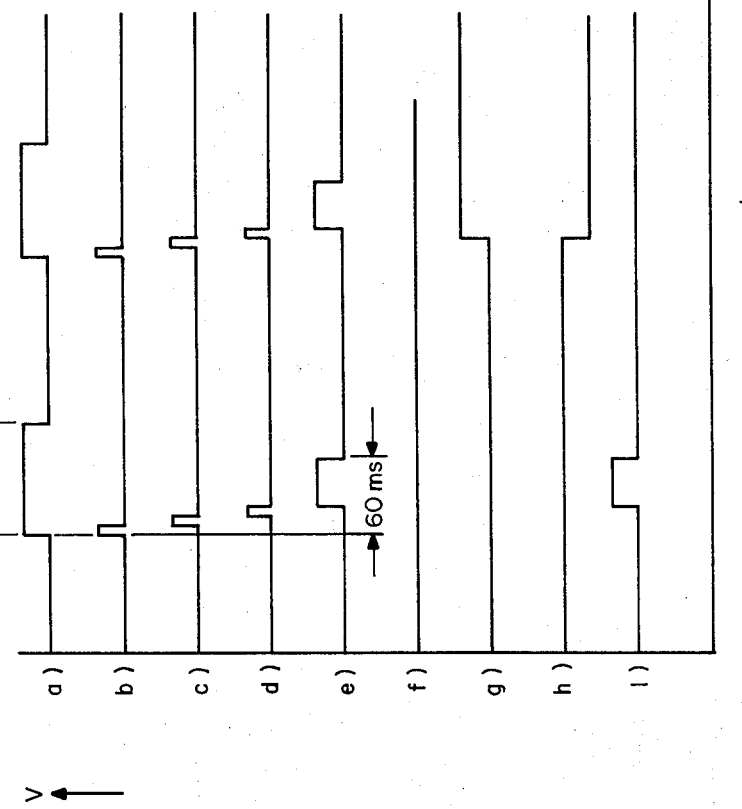
FIG. 4 is a waveform diagram showing the operation on a certain input signal to the system shown in FIG. 1.

With reference to FIGS. 1 and 4, typical processing circuitry will condition the Doppler signals to provide uniform duration pulses of, for example, 180 ms. in the present embodiment as is illustrated in FIG. 4-a. Accordingly, the leading edge of each alleged heartbeat signal will trigger one shot 18 to provide a 5 ms. output shown in FIG. 4-b which trailing edge in turn, generates a second 5 ms. signal from one shot 19 as shown at FIG. 4-c, again, its trailing edge generates yet a third 5 ms. pulse from one shot 21 as is illustrated at FIG. 4-d. The trailing edge of the pulse from one shot 21, in turn, triggers one shot 22 to generate a 44.68 ms. pulse causing at the leading edge, the capacitor of the function generator to charge up to the 6 volt level and be held at that level until the duration of the 44.68 ms. period. At the trailing edge of the one shot 22 pulse, the capacitor of the function generator 23 begins to discharge along the hyperbolic curve displayed in FIG. 2.

Upon occurrence of the next Doppler pulse or alleged heartbeat which generates yet another pulse at one shot 22, the function generator will again be charged up. However, during the 5 ms. period immediately preceding the second triggering of one shot 22, one shot 21 will close gate 24′ causing the function generator to be sampled and providing a signal at the sample and hold unit 24. This signal represents a potential which is proportional to the heart rate on a beat-to-beat basis. In a similar manner, as one shot 18 and one shot 19 are triggered, sample and hold units 26 and 25 will accept signals being held at the sample and hold gates 25 and 24 respectively, as gates 26′ and 25′ are temporarily and consecutively closed.

The signals present in sample and hold units 24 and 25 are compared at credence checker 32, and similarly, the signals in the sample and hold units 26 and 25 are compared to the credence checker 33. Assuming the criteria at each of the credence checkers 32, 33 and 40, is not exceeded, no output, as represented at FIG. 4-f, will appear on the lead lines to the NOR gate 43 in which case NOR gate 43 will remain "on" to pass the pulse signal generated by one shot 22 through the gate 44 to close switch 27′. Assuming the criteria at credence checker 40 is also not exceeded, the NOR gate 43 input to gate 44 is grounded to ensure closing of switch 27′ and passing of the latest pulse signal from one shot 22, irrespective of the output of credence checkers 32, 33. Upon the closing of switch 27′ the signal from sample and hold unit 24 is received at the sample and hold unit 27. During the next cycle, the signal at sample and hold unit 27 is transferred to sample and hold unit 28 upon the triggering of one shot 19.

In a similar manner, the sample and hold unit 29 will receive the signal from sample and hold unit 28 upon the triggering of one shot 18 during the next successive cycle. The signals in sample and hold units 27, 28 and 29 are added via their output resistors by an output unit 31 which is adapted to take the average of these three signals whereby the average signal is displayed on, for example, a chart recorder, a digital volt meter, or an analogue volt meter.

Assuming, for example, that as to any cardiac signal the credence checker 32 indicates that, for example, the beats per minute per beat might exceed 20 cycles positive or negative as is illustrated at FIG. 4-g, NOR gate 43 is inhibited (see FIG. 4-h). Gate 44 will therefore inhibit the pulse passing from one shot 22 (see FIG. 4-i) thereby leaving switch 27′ in its normally opened position so as not to accept the signal from the sample and hold unit 24 since it has been indicated by credence checker 32 that this signal appears to be an inaccurate one. With this interruption of the flow of data to the sample and hold unit 27 by occurrence of an artifact signal the last previous piece of valid information in sample and hold unit 27 will be maintained and transferred additionally through to the next sample and hold unit 28.

To indicate that new input signals have been rejected as artifact when the predetermined credence criteria has not been met and that the average heart rate is made on the sample of only two as opposed to three successive signals, the inhibiting of NOR gate 43 will also cause the normally closed switch 45 to be opened. In such circumstance, the AC source input which is normally grounded will be fed via capacitor 47 to the input unit 31. This additional output allows some of the AC source signal to be applied to the output causing the resultant pen and ink trace, in the case of a chart recorder, to be widened to visibly indicate "artifact." This, in effect, provides a review of the immediately previous heartbeat rate with an indication that the credence criteria have not been met by the latest heartbeat signals and that some problem may exist.

It may be observed from the above, that absent credence checker 40, credence checkers 32, 33 would require at least three consecutive beats to be within the tolerance of the credence system before any input signal is allowed to be transferred to the output sample and hold unit 27. Although such an arrangement provides fairly reliable results, it is expedient to provide a credence check 40 which compares the newest data in sample and hold 24 with the last good valid in sample and hold 27. If this latter test fails, in that the tolerance is exceeded, the output of NOR gate 43 is allowed to function normally, that is, should either or both credence check units 32 or 33 fail, NOR gate 43 inhibits application of the newest data via gate 44 to the sample and hold unit 27, and broadening of the pen/ink trace and/or an acoustical or optical alarm is excited. However, if the test of credence check unit 40 is passed, to indicate that the newest data in sample and hold 24 and the last piece of valid data in sample and hold 27 are within tolerance limits, then the decision is made that the newest data in sample and hold 24 is good and should be passed to sample and hold unit 27 in which case NOR gate 43 is inhibited from being actuated by either of the credence check units 32, 33 in case either or both should be energized by virtue of exceeding tolerance limits. The advantage by including credence check unit 40 allows the newest data which is valid to be passed to the sample and hold unit 27. Otherwise valid data is not passed to the sample and hold unit 27 until artifact has cleared sample and hold units 25 and 26 taking a duration of three heartbeats. This addition, in effect, reduces the number of "artifact" indications.

I claim:

1. Apparatus for monitoring the heartbeat of a patient comprising:
   means for deriving electrical signals representative of heartbeat activity on a beat-to-beat data basis;
   gating means for normally passing said electrical signals and actuable to inhibit the passing of selected one(s) of said signals;
   first analyzing means for selectively comparing three consecutive ones of said electrical signals to define a first criterion for distinguishing valid data and artifact and actuating said gating means upon detection of artifact,
   output storage means for receiving and averaging valid data over a period of three successive heartbeats to provide an output indicative of heartbeat rate;
   second analyzing means for comparing the third one of said signals with the last passed valid data to define a second criterion for distinguishing valid data and artifact and upon detection of valid data preventing actuation of said gating means by the first analyzer means.

2. Apparatus according to claim 1 wherein said first analyzer means compares within a predetermined frequency tolerance a first and second one of said signal values and the second and a third one of said signal values.

3. Apparatus according to claim 2 wherein said second analyzer means makes a comparison within a predetermined frequency tolerance.

4. Apparatus according to claim 1 including indicator means energized upon actuation of said gating means for indicating the detection of artifact.

* * * * *